United States Patent Office 3,165,414
Patented Jan. 12, 1965

3,165,414
PREPARATION OF RAISIN PASTE
Fredoon S. Nury, Richmond, Calif., assignor to the United States of America as represented by the Secretary of Agriculture
No Drawing. Filed Oct. 8, 1963, Ser. No. 314,817
2 Claims. (Cl. 99—100)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of my copending application, Serial No. 198,650, filed May 29, 1962, now abandoned.

This invention relates to and has among its objects the preparation of raisin pastes which exhibit novel properties, particularly from the standpoint of texture. Further objects of the invention will be evident from the following description wherein parts and percentages are by weight unless otherwise specified.

In the preparation of bakery products, it is often desirable to have available for immediate use fruit products in the form of pastes. A common product of this type is fig paste which is widely used in the preparation of such bakery goods as fig bars, sweet rolls, and the like. Attempts have been made to prepare a similar paste from raisins but without practical success. When raisins are ground to a paste the resulting product, as prepared, has a suitable texture for spreading on layers of dough or the like. However, when the raisin paste is stored it sets to a hard mass which cannot be spread. Indeed, the paste becomes so hard it is virtually impossible to remove it from the container. It may be noted that this setting is not caused by a loss of moisture; it occurs when the product is sealed in moisture-impenetrable containers. Various attempts have been made to remedy this problem by blending different additives into the paste when it is prepared. None of these additives yield any significant improvement and the net result is that raisin paste is available to the baker only if he has the facilities on the premises for preparing it from raisins for immediate use.

By applying the process of the invention one is enabled to prepare raisin pastes which retain their character of being plastic or spreadable, even when stored for long periods. Accordingly, the products of the invention can be produced in a central location and then shipped to bakeries where they will be available for use at any time. In preparing raisin products in accordance with the invention, raisins are first ground to form a paste. The paste is then filled into a container which is then closed and placed in an oven or similar heated environment where the paste is baked. Following this baking operation the paste is cooled, packaged, and is then ready for sale. A particular advantage of the invention is that the paste consists entirely of raisins; no additives of any kind are used. The critical point in the process of the invention is the step of baking the paste. The effect of this baking step cannot be explained on a scientific basis but the fact remains that it causes some chemical or physical changes so that the tendency of the paste to set is drastically reduced. The baking of the paste is conducted at a temperature in the range about from 100° to 200° F. for a period of time long enough for the setting tendency of the paste to be substantially reduced. This time will vary considerably, depending particularly on the baking temperature selected. Thus, at the lower temperatures in the aforesaid range—for instance, 100 to 120° F.—the desired result is achieved with a baking time of about 1 to 10 days. At higher temperatures, the desired changes occur much more rapidly so that at about 160—180° F., for example, the baking need be continued only for a period of about ½ to 2 hours. It is also obvious that the time for baking will depend to some extent on the heat transfer situation in the baking operation. For example, if the baking is applied to the paste in the form of a thick layer or large mass, it will take longer for the paste to reach the baking temperature and consequently the baking is continued for a longer period than is the case where the paste is spread out in the form of a thin film. Taking into account these various factors, the baking is conducted at a temperature in the range about from 100° to 200° F. for a period of time long enough for the setting tendency of the paste to be substantially reduced, this time being anywhere from ¼ hour to 10 days, depending on the factors explained above.

The time of baking required with any given batch of raisins can be determined by pilot trials wherein samples of paste prepared from the raisins are subjected to varying temperatures and/or times of baking and the texture of the products observed after storage. From this data one can determine the appropriate conditions of time and temperature needed to attain a desired degree of texture stability with the said lot of raisins. As noted above, the paste is baked while enclosed in a closed container. This is done to prevent loss of moisture; this in itself would render the paste hard and of little use. The moisture content of the raisins to which the process of the invention is applied may vary. Generally, the raisins contain about 12 to 20% moisture. Since the presence of moisture has an influence on texture of the paste, it is evident that moister raisins will provide a paste of softer texture than will raisins of lesser moisture content.

The invention is further demonstrated by the following examples:

Example I

Raisins having a moisture content of 16.9% were ground in a meat grinder to prepare a paste. This material was divided into three lots, all of which were filled into containers (conventional Mason jars) and sealed. One lot (A) was baked in an oven at 110° F. for 10 days; another lot (B) was baked in an oven at 120° F. for 2 days; the third lot (C) was not baked, thus to serve as a control. Following this, the material (still in the sealed containers) was stored at room temperature. The texture of the original paste and that after storage was determined by compressing the paste in a press provided with instruments for recording the pressure corresponding to a standard reduction in thickness of a weighed sample of the paste. In this test of texture, a higher figure of pressure denotes a paste of harder texture, and vice versa. The results obtained are tabulated below:

| Lot | Baking treatment | Pressure required to compress sample, lbs. | | |
|---|---|---|---|---|
| | | Initial (as prepared) | After 30 days storage | After 90 days storage |
| A | 110° F, 10 days | 480 | 660 | 700 |
| B | 120° F., 2 days | 480 | 700 | 705 |
| C | None (control) | 480 | 1,390 | 1,440 |

*Example II*

Raisins having a moisture content of 15% were ground in a meat grinder to prepare a paste. This paste was filled into containers (conventional Mason jars) and sealed. One lot of the paste was baked in an oven at 112° F. for 11 days. The other lot of the paste was not baked to provide a control. Following this, the products (still in the sealed containers) were stored at room temperature and measurements were made of their texture as described in Example I. The results are tabulated below:

| Baking treatment | Pressure required to compress sample, lbs. | | | |
|---|---|---|---|---|
| | Initial (as prepared) | After 5 days storage | After 20 days storage | After 90 days storage |
| 112° F., 11 days | 595 | 710 | 720 | 750 |
| None (control) | 595 | 1,020 | 1,425 | 1,670 |

*Example III*

The procedure as set forth in Example II was repeated except that in this case the raisins used as the starting material contained 18.2% moisture.

The product which had been baked (11 days at 112° F.) gave a reading of 440 lbs. after storage for 150 days at room temperature, whereas the control after the same storage period gave a reading of 950 lbs.

*Example IV*

Raisins having a moisture content of 16.5% were ground in a meat grinder to prepare a paste. This material was divided into a series of lots, each of which was placed in a closed glass container. The lots of paste were then baked for various times and temperatures (as set forth below). Following this, the treated pastes (still in the sealed containers) were stored for 30 days at room temperature. The various products were then tested as described in Example I. The results obtained are tabulated below:

| Sample | Baking conditions | | Pressure required to compress sample, after storage 30 days, lbs. |
|---|---|---|---|
| | Temp., ° F. | Time, hrs. | |
| Control | None | None | 1,272 |
| A | 120 | 16 | 513 |
| B | 140 | 8 | 598 |
| C | 140 | 4 | 577 |
| D | 160 | 2 | 506 |
| E | 160 | 1 | 519 |
| F | 180 | 2 | 332 |
| G | 180 | 0.5 | 350 |

Having thus described the invention, what is claimed is:

1. In the process of preparing raisin paste wherein raisins are ground to form a paste, the improvement which comprises baking the paste at a temperature about from 100 to 200° F. for a period about from ¼ hour to 10 days while it is enclosed in a closed container, to reduce the tendency of the paste to set during storage.

2. In the process for preparing raisin paste wherein raisins are ground and the resulting paste is packaged in a moisture-tight container, the improvement which comprises subjecting said raisin paste to baking at a temperature about from 100 to 200° F. for a period of about from ¼ hour to 10 days while it is enclosed in a closed container, thereafter cooling said paste and packaging it.

References Cited by the Examiner
UNITED STATES PATENTS

| 611,782 | 10/98 | Forsyth | 99—104 X |
| 1,341,057 | 5/20 | Hunter | 99—104 X |
| 1,607,886 | 11/26 | Forrest | 99—104 |

OTHER REFERENCES

Betty Crocker's Picture Cook Book, 1st Ed., McGraw-Hill, New York, 1950, p. 197

A. LOUIS MONACELL, *Primary Examiner.*